(12) United States Patent
Zheng et al.

(10) Patent No.: US 8,710,976 B2
(45) Date of Patent: Apr. 29, 2014

(54) AUTOMATED INCORPORATION OF EXPERT FEEDBACK INTO A MONITORING SYSTEM

(75) Inventors: Yibin Zheng, Hartland, WI (US); Fang Tu, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 13/349,667

(22) Filed: Jan. 13, 2012

(65) Prior Publication Data

US 2013/0181827 A1    Jul. 18, 2013

(51) Int. Cl.
*G08B 23/00*    (2006.01)

(52) U.S. Cl.
USPC ... 340/501; 340/506; 340/539.1; 340/539.11; 340/539.13; 340/3.1

(58) Field of Classification Search
USPC ............ 340/501, 506, 539.1, 539.11, 539.13, 340/3.1
See application file for complete search history.

(56) References Cited

U.S. PATENT DOCUMENTS

| | | | |
|---|---|---|---|
| 5,959,529 A | * | 9/1999 | Kail, IV .................. 340/539.12 |
| 6,970,804 B2 | | 11/2005 | Siegel et al. |
| 6,981,182 B2 | | 12/2005 | Roddy et al. |

* cited by examiner

*Primary Examiner* — Daryl Pope
(74) *Attorney, Agent, or Firm* — William T. Kryger

(57) ABSTRACT

A system, computer-readable medium, and method for updating a decisioning algorithm are provided. In the method, operational parameter data from a first device is evaluated using a decisioning algorithm to determine if an alert should be sent. The alert indicates a possible performance issue associated with a component of the first device. The operational parameter data includes a value of an operating characteristic of the first device. When a determination is made to send the alert, an alert message including a first indicator indicating the possible performance issue of the component of the first device is created. The alert message is sent to a second device. The decisioning algorithm is updated based on a second indicator received from a third device. The second indicator indicates either that the alert was useful or that the alert was not useful.

19 Claims, 6 Drawing Sheets

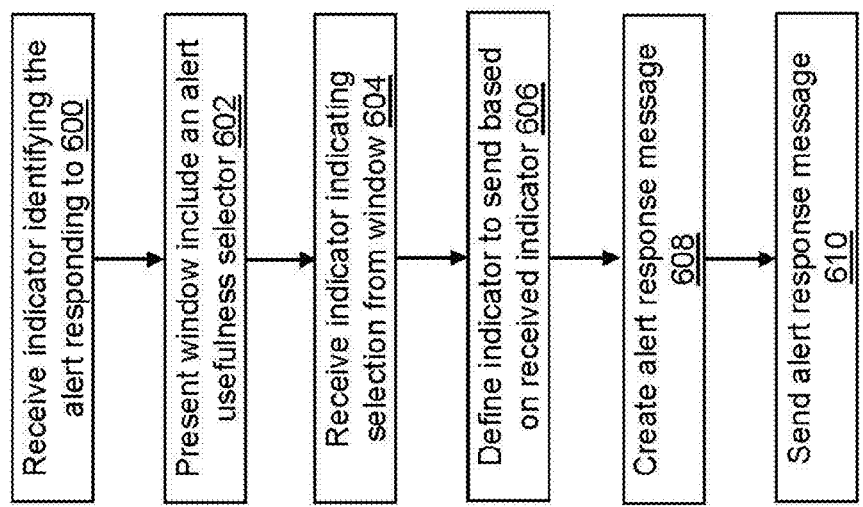

AUTOMATED INCORPORATION OF EXPERT FEEDBACK INTO A MONITORING SYSTEM

BACKGROUND

Diagnostic algorithms have been developed for complex electronic devices to identify the cause of failure in a component of the electronic device as well as to predict the occurrence of a particular failure type as indicated by operational parameters generated by sensors mounted to various components of the electronic device. Neural networks, decision trees, case based reasoning, etc., have been employed to learn from data generated by the electronic devices to provide prediction and classification in the context of diagnostics. Diagnostic algorithms generally utilize extensive life-testing of components of the electronic devices to determine nominal and threshold values for critical parameters used to identify the failures or predicted failures.

SUMMARY

In an example embodiment, a method for updating a decisioning algorithm is provided. The method includes, but is not limited to, evaluating operational parameter data, received from a first device, using a decisioning algorithm to determine if an alert should be sent. The alert indicates a possible performance issue associated with a component of the first device, and the operational parameter data comprises a value of an operating characteristic of the first device. When a determination is made to send the alert, an alert message is created and sent to a second device. The alert message includes a first indicator indicating the possible performance issue of the component of the first device. The decisioning algorithm is updated based on a second indicator received from a third device. The second indicator indicates either that the alert was useful or that the alert was not useful.

In another example embodiment, a computer-readable medium is provided having stored thereon computer-readable instructions that when executed by a computing device, cause the computing device to perform the method of updating a decisioning algorithm.

In yet another example embodiment, a system is provided. The system includes, but is not limited to, a monitoring device. The monitoring device includes, but is not limited to, a processor and the computer-readable medium operably coupled to the processor. The computer-readable medium has instructions stored thereon that when executed by the processor, cause the system to perform the method of updating a decisioning algorithm.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements.

FIG. 6 depicts a flow diagram illustrating example operations performed through use of an alert response application of the alert response device of FIG. 4 in accordance with an illustrative embodiment.

DETAILED DESCRIPTION

Figure 1:
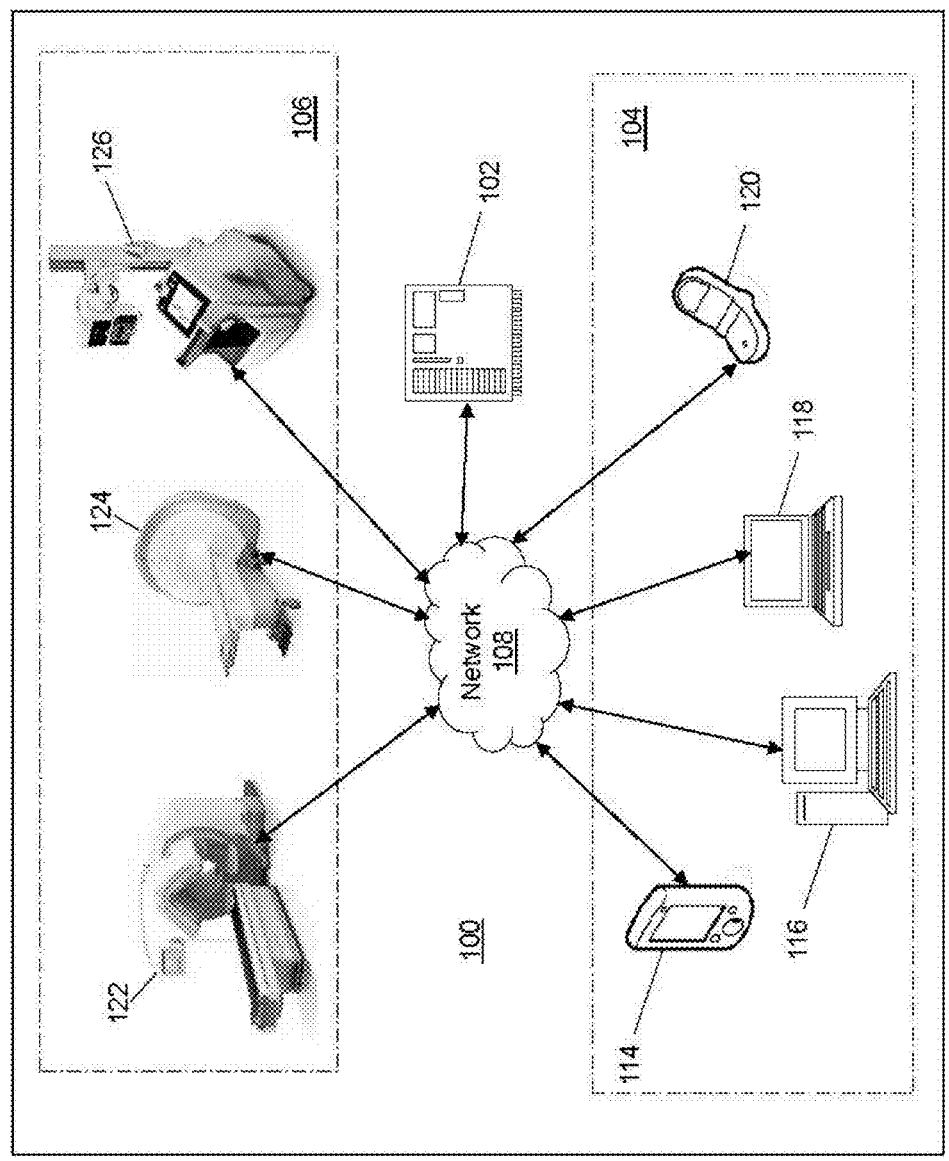
FIG. 1 depicts a block diagram of a device monitoring system in accordance with an illustrative embodiment.

With reference to FIG. 1, a block diagram of a device monitoring system 100 is shown in accordance with an illustrative embodiment. In an illustrative embodiment, device monitoring system 100 may include a monitoring device 102, a plurality of alert response devices 104, a plurality of monitored devices 106, and a network 108. The components of device monitoring system 100 may be positioned in a single facility or may be geographically remote from one another. Monitoring device 102 may be a computer of any form factor. Monitoring device 102 further may be comprised of one or more connected computers.

Monitoring device 102 captures expert knowledge from the plurality of alert response devices 104 while remotely monitoring a condition of the plurality of monitored devices 106. Monitoring device 102 generates automated failure alerts for components and subsystems of the plurality of monitored devices 106 based on real time data transmitted by each device of the plurality of monitored devices 106. When an expert subsequently investigates such an alert, the expert provides a binary feedback as to the accuracy of the generated alert. As monitoring device 102 collects feedback from the plurality of alert response devices 104 along with the alert data context from many devices, experts, and incidents, monitoring device 102 adjusts decision boundaries for each type of alert to maximize agreement with expert opinions, thereby achieving automated learning.

Network 108 can be any type of wired and/or wireless public or private network including a cellular network, a local area network, a wide area network such as the Internet, etc. Network 108 may include one or more networks of the same or different types. Network 108 further may be comprised of sub-networks and consist of any number of devices.

The plurality of alert response devices 104 may include one or more computing devices that send and receive signals through network 108 to/from monitoring device 102 and/or to/from one or more of the plurality of monitored devices 106. The plurality of alert response devices 104 may include any number and type of computing devices that may be organized into subnets. The plurality of alert response devices 104 may include computers of any form factor such as a personal digital assistant 114, a desktop 116, a laptop 118, an integrated messaging device, a cellular telephone 120, a smart phone, a pager, etc. The plurality of alert response devices 104 may include additional types of devices. The plurality of alert response devices 104 communicate using various transmission media that may be wired or wireless as known to those skilled in the art. As an example, a field engineer or technician may use a computing device of the plurality of alert response devices 104 to receive an alert related to a monitored device of the plurality of monitored devices 106, to receive information related to a current condition of the monitored device, to update a status of the monitored device, to communicate with the monitored device, to provide feedback related to the alert to monitoring device 102, etc.

The plurality of monitored devices 106 may include one or more devices that send and receive signals through network 108 to/from monitoring device 102 and/or to/from the plurality of alert response devices 104. The plurality of monitored devices 106 may include any number and type of devices that may be organized into subnets. In the illustrative embodiment of FIG. 1, the plurality of monitored devices 106 may include a computed tomography device 122, a magnetic resonance imaging device 124, and an x-ray device 126. The illustrative embodiment is not intended to limit the plurality of monitored devices 106 to medical imaging devices. The plurality of monitored devices 106 may include additional or different types of devices for which a status of the device may be monitored remotely using sensors to obtain one or more operational characteristics of the device. For example, additional types of devices may include machines used in industrial processes, transportation systems, power generation, etc. The plurality of monitored devices 106 communicate using various transmission media that may be wired or wireless as known to those skilled in the art.

Figure 2:
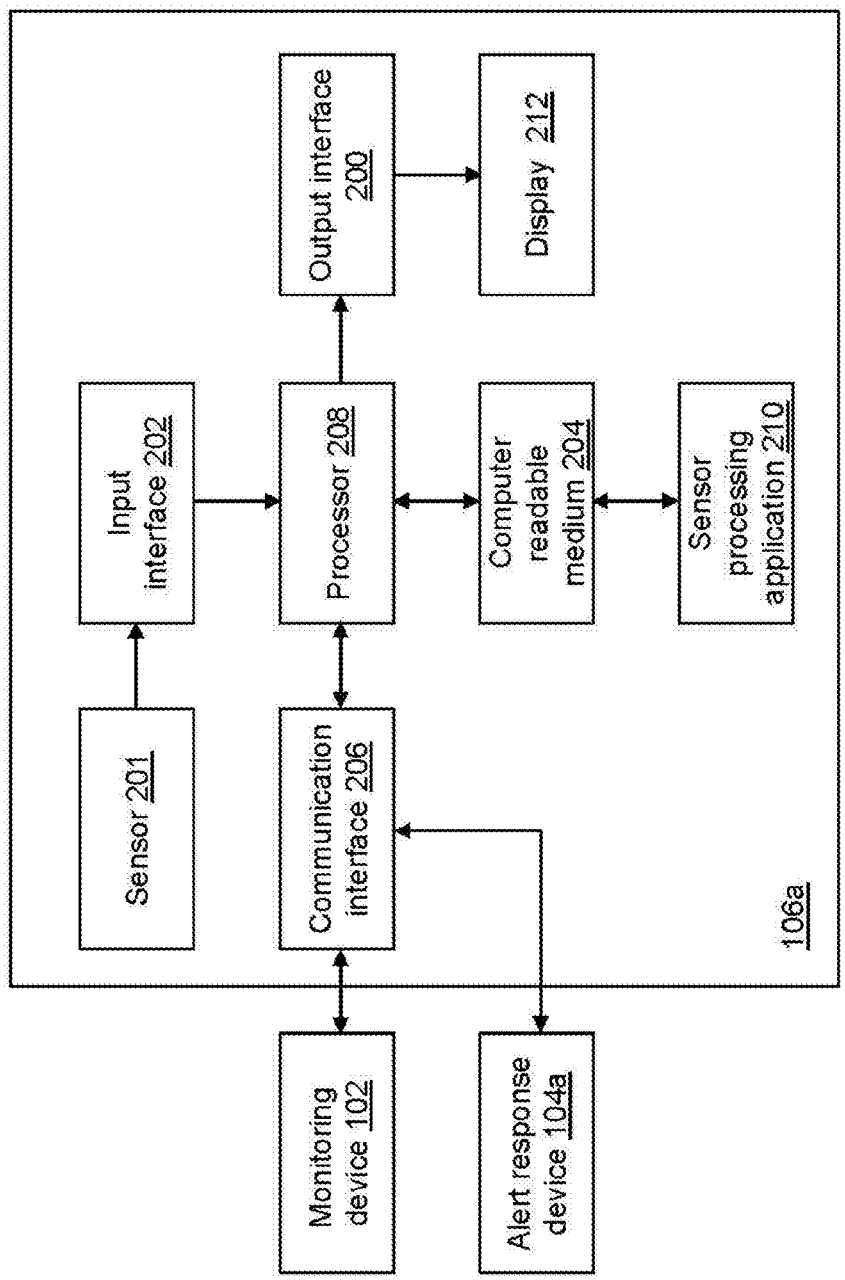
FIG. 2 depicts a block diagram of a monitored device of the device monitoring system of FIG. 1 in accordance with an illustrative embodiment.

With reference to FIG. 2, a block diagram of a monitored device 106a of the plurality of monitored devices 106 is shown in accordance with an illustrative embodiment. Monitored device 106a may include an output interface 200, a sensor 201, an input interface 202, a computer-readable medium 204, a communication interface 206, a processor 208, a sensor processing application 210, and a display 212. Different and additional components may be incorporated into monitored device 106a.

Output interface 200 provides an interface for outputting information for review by a user of monitored device 106a. For example, output interface 200 may include an interface to display 212. Display 212 may be a thin film transistor display, a light emitting diode display, a liquid crystal display, or any of a variety of different displays known to those skilled in the art. Monitored device 106a may have one or more output interfaces that use the same or a different interface technology. Display 212 further may be accessible to monitored device 106a through communication interface 206.

Sensor 201 provides a measurement value of an operational characteristic of monitored device 106a. Monitored device 106a may include a plurality of sensors that use the same or a different sensing technology to measure a value of the same or different operational characteristics of monitored device 106a. For example, sensor 201 may be a temperature gauge that measures a temperature of a component of monitored device 106a. As other examples, sensor 201 may measure a voltage level, a current level, an electromagnetic field level, a speed level, an acceleration level, a pressure level, etc. associated with any component of monitored device 106a. Sensor 201 converts a measured parameter into an electrical signal that is input to input interface 202

Input interface 202 provides an interface for receiving information from sensor 201 as known to those skilled in the art. Input interface 202 may use various input technologies. Monitored device 106a may have one or more input interfaces that use the same or a different input interface technology. For example, input interface 202 may also provide an interface for receiving information from the user for entry into monitored device 106a as known to those skilled in the art. Input interface 202 may use various input technologies including, but not limited to, a keyboard, a pen and touch screen, a mouse, a track ball, a touch screen, a keypad, one or more buttons, etc. to allow the user to enter information into monitored device 106a or to make selections presented in a user interface displayed on display 212.

Computer-readable medium 204 is an electronic holding place or storage for information so that the information can be accessed by processor 208 as known to those skilled in the art. Computer-readable medium 204 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Monitored device 106a may have one or more computer-readable media that use the same or a different memory media technology. Monitored device 106a also may have one or more drives that support the loading of a memory media such as a CD or DVD.

Communication interface 206 provides an interface for receiving and transmitting data between devices using various protocols, transmission technologies, and media as known to those skilled in the art. Communication interface 206 may support communication using various transmission media that may be wired or wireless. Monitored device 106a may have one or more communication interfaces that use the same or a different communication interface technology. Data and messages may be transferred between monitored device 106a and monitoring device 102 and/or an alert response device 104a using communication interface 206.

Processor 208 executes instructions as known to those skilled in the art. The instructions may be carried out by a special purpose computer, logic circuits, or hardware circuits. Thus, processor 208 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 208 executes an instruction, meaning that it performs/controls the operations called for by that instruction. Processor 208 operably couples with output interface 200, with input interface 202, with computer-readable medium 204, and with communication interface 206 to receive, to send, and to process information. Processor 208 may retrieve a set of instructions from a permanent memory device and copy the instructions in an executable form to a temporary memory device that is generally some form of RAM. Monitored device 106a may include a plurality of processors that use the same or a different processing technology.

Sensor processing application 210 performs operations associated with processing of a signal from sensor 201 to define a value associated with an operational characteristic of a component of monitored device 106a. Sensor processing application 210 may process a plurality of signals to form operational parameter data that is sent to monitoring device 102. Sensor processing application 210 may log the operational parameter data and either continuously or periodically or as otherwise scheduled send the data to monitoring device 102. Thus, the operational parameter data may be sent in real time. Some or all of the operations described herein may be embodied in sensor processing application 210. The operations may be implemented using hardware, firmware, software, or any combination of these methods. With reference to the example embodiment of FIG. 2, sensor processing application 210 is implemented in software (comprised of computer-readable and/or computer-executable instructions) stored in computer-readable medium 204 and accessible by processor 208 for execution of the instructions that embody the operations of sensor processing application 210. Sensor processing application 210 may be written using one or more programming languages, assembly languages, scripting languages, etc.

Figure 3:
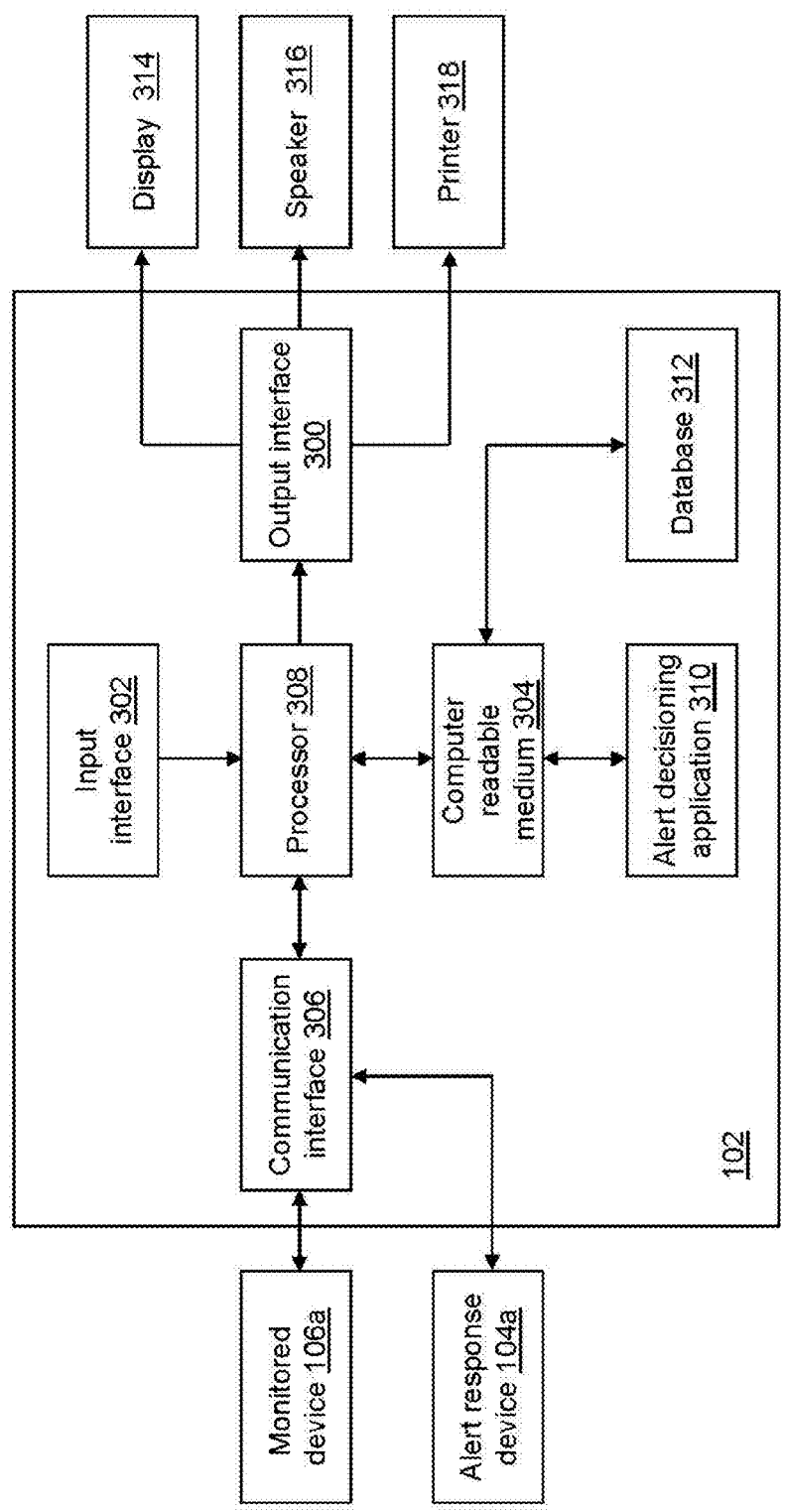
FIG. 3 depicts a block diagram of a monitoring device of the device monitoring system of FIG. 1 in accordance with an illustrative embodiment.

With reference to FIG. 3, a block diagram of monitoring device 102 is shown in accordance with an illustrative embodiment. Monitoring device 102 may include a second output interface 300, a second input interface 302, a second computer-readable medium 304, a second communication interface 306, a second processor 308, an alert decisioning application 310, and a database 312. Different and additional components may be incorporated into monitoring device 102.

Output interface 300 provides an interface for outputting information for review by a user of monitoring device 102. For example, output interface 300 may include an interface to a second display 314, a speaker 316, a printer 318, etc. Second display 314 may be a thin film transistor display, a light emitting diode display, a liquid crystal display, or any of a variety of different displays known to those skilled in the art. Speaker 316 may be any of a variety of speakers as known to those skilled in the art. Printer 318 may be any of a variety of printers as known to those skilled in the art. Monitoring device 102 may have one or more output interfaces that use the same or a different interface technology. Second display 314, speaker 316, and/or printer 318 further may be accessible to monitoring device 102 through communication interface 306.

Second input interface 302 provides an interface for receiving information from the user for entry into monitoring device 102 as known to those skilled in the art. Second input interface 302 may use various input technologies including, but not limited to, a keyboard, a pen and touch screen, a mouse, a track ball, a touch screen, a keypad, one or more buttons, etc. to allow the user to enter information into monitoring device 102 or to make selections presented in a user interface displayed on second display 314. The same interface may support both second input interface 302 and second output interface 300. For example, a touch screen both allows user input and presents output to the user. Monitoring device 102 may have one or more input interfaces that use the same or a different input interface technology.

Second computer-readable medium 304 provides the same or similar functionality as that described with reference to computer-readable medium 204 of monitored device 106a. Second communication interface 306 provides the same or similar functionality as that described with reference to communication interface 206 of monitored device 106a. Second processor 308 provides the same or similar functionality as that described with reference to processor 208 of monitored device 106a.

Alert decisioning application 310 performs operations associated with processing the operational parameter data received from the plurality of monitored devices 106 to determine, using a decisioning algorithm, a likelihood that any component of a device of the plurality of monitored devices 106 is about to fail or needs a servicing action. Alert decisioning application 310 also may determine if an alert message should be sent. Some or all of the operations described herein may be embodied in alert decisioning application 310. The operations may be implemented using hardware, firmware, software, or any combination of these methods. With reference to the example embodiment of FIG. 3, alert decisioning application 310 is implemented in software (comprised of computer-readable and/or computer-executable instructions) stored in second computer-readable medium 304 and accessible by second processor 308 for execution of the instructions that embody the operations of alert decisioning application 310. Alert decisioning application 310 may be written using one or more programming languages, assembly languages, scripting languages, etc.

Monitoring device 102 includes or can access database 312 either through a direct connection or through network 108. Second computer-readable medium 304 may provide the electronic storage medium for database 312. Database 312 is a data repository for device monitoring system 100. Database 312 may include a plurality of databases that may be organized into multiple database tiers to improve data management and access. Database 312 may utilize various database technologies and a variety of different formats as known to those skilled in the art including a file system, a relational database, a system of tables, a structured query language database, etc. Database 312 may be implemented as a single database or as multiple databases stored in different storage locations distributed over the Internet or other heterogeneous storage infrastructures.

Figure 4:
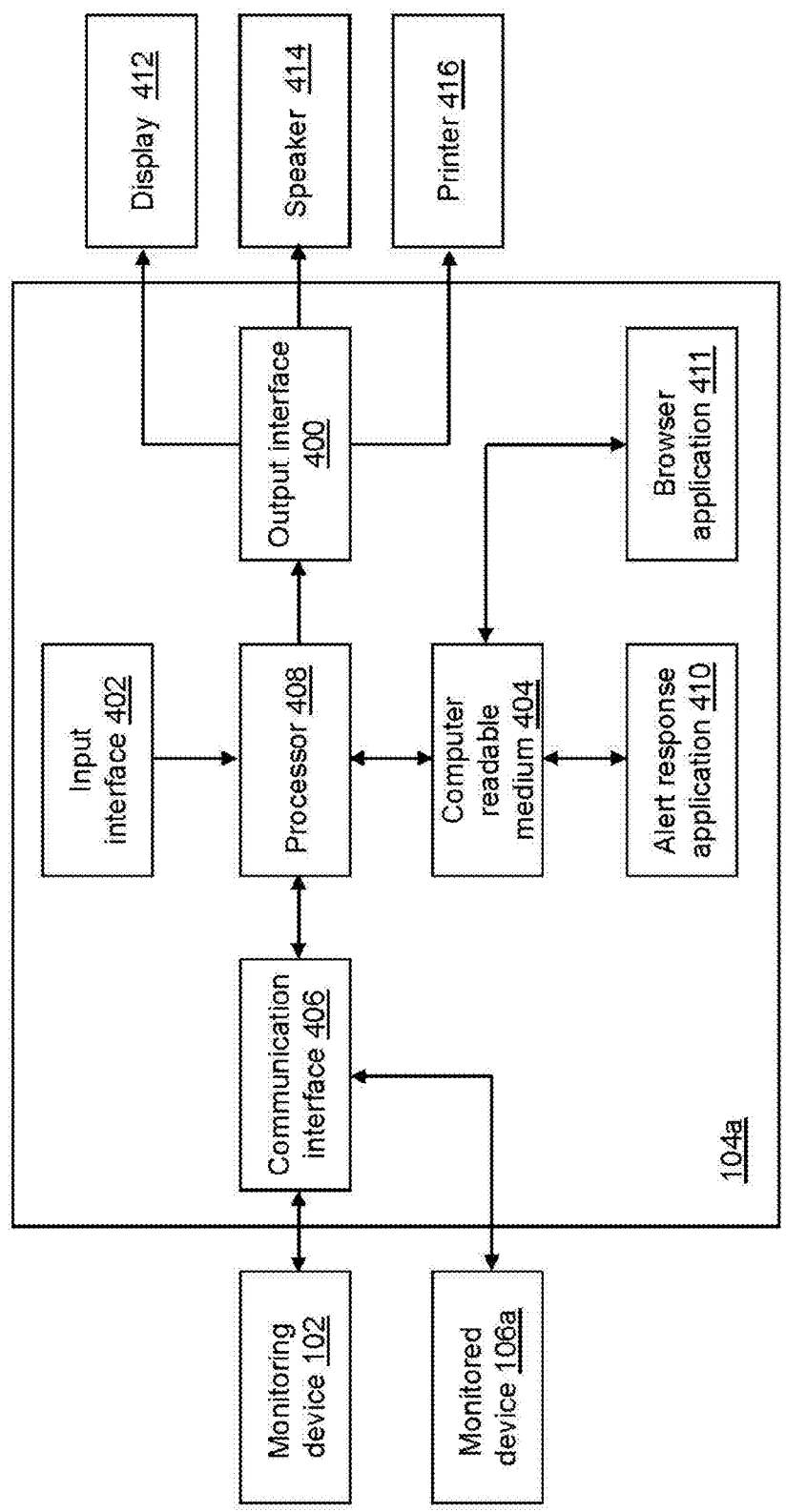
FIG. 4 depicts a block diagram of an alert response device of the device monitoring system of FIG. 1 in accordance with an illustrative embodiment.

With reference to FIG. 4, a block diagram of alert response device 104a of the plurality of alert response devices 104 is shown in accordance with an illustrative embodiment. Alert response device 104a is an example computing device of the plurality of alert response devices 104. Alert response device 104a may include a third output interface 400, a third input interface 402, a third computer-readable medium 404, a third communication interface 406, a third processor 408, an alert response application 410, a browser application 411, a third display 412, a second speaker 414, and a second printer 416. Different and additional components may be incorporated into alert response device 104a.

Third output interface 400 provides the same or similar functionality as that described with reference to second output interface 300 of monitoring device 102. Third input interface 402 provides the same or similar functionality as that described with reference to second input interface 302 of monitoring device 102. Third computer-readable medium 404 provides the same or similar functionality as that described with reference to second computer-readable medium 304 of monitoring device 102. Third communication interface 406 provides the same or similar functionality as that described with reference to second communication interface 306 of monitoring device 102. Third processor 408 provides the same or similar functionality as that described with reference to second processor 308 of monitoring device 102. Third display 412 provides the same or similar functionality as that described with reference to second display 314 of monitoring device 102. Second speaker 414 provides the same or similar functionality as that described with reference to speaker 316 of monitoring device 102. Second printer 416 provides the same or similar functionality as that described with reference to printer 318 of monitoring device 102.

Alert response application 410 performs operations associated with responding to an alert generated by alert decisioning application 310. Some or all of the operations described herein may be embodied in alert response application 410. The operations may be implemented using hardware, firmware, software, or any combination of these methods. With reference to the example embodiment of FIG. 4, alert response application 410 is implemented in software (comprised of computer-readable and/or computer-executable instructions) stored in third computer-readable medium 404 and accessible by third processor 408 for execution of the instructions that embody the operations of alert response application 410. Alert response application 410 may be written using one or more programming languages, assembly languages, scripting languages, etc.

Alert decisioning application 310 and alert response application 410 may be the same or different applications or part of an integrated, distributed application supporting some or all of the same types of functionality as described herein. Alert response application 410 may be implemented as a Web application executing, for example, at monitored device 106a, at monitoring device 102, and/or at alert response device 104a. Alert response application 410 may be implemented to support any type of communication protocol. For example, alert response application 410 may be configured to accept hypertext transport protocol (HTTP) requests from client devices such as the plurality of alert response devices 104 and/or the plurality of monitored devices 106 and to send HTTP responses along with optional additional data content which may include web pages such as hypertext markup language (HTML) documents and linked objects in response to the HTTP requests.

Alert decisioning application 310 further may provide information or data organized in the form of a website accessible over network 108. A website may comprise multiple web pages that display a specific set of information and may contain hyperlinks to other web pages with related or additional information. Each web page is identified by a uniform resource locator (URL) that includes the location or address of the computing device that contains the resource to be accessed in addition to the location of the resource on that computing device. The type of file or resource depends on the Internet application protocol. For example, HTTP and HTTP secure (HTTPS) describe a web page to be accessed with a browser application. The file accessed may be a simple text file, an image file, an audio file, a video file, an executable, a common gateway interface application, a Java applet, or any other type of file supported by HTTP.

Browser application 411 performs operations associated with retrieving, presenting, and traversing information resources provided by a web application and/or web server as known to those skilled in the art. An information resource is identified by a uniform resource identifier (URI) and may be a web page, image, video, or other piece of content. Hyperlinks in resources enable users to navigate to related resources. Example browser applications include Navigator by Netscape Communications Corporation, Firefox® by Mozilla Corporation, Opera by Opera Software Corporation, Internet Explorer® by Microsoft Corporation, Safari by Apple Inc., Chrome by Google Inc., etc. as known to those skilled in the art. If alert response application 410 is implemented as a Web application, alert response device 104a may include browser application 411 to access functionality provided by alert decisioning application 310 without need for alert response application 410 being installed on alert response device 104a. Thus, alert response device 104a need not include both alert response application 410 and browser application 411 as discrete applications.

Figure 5:
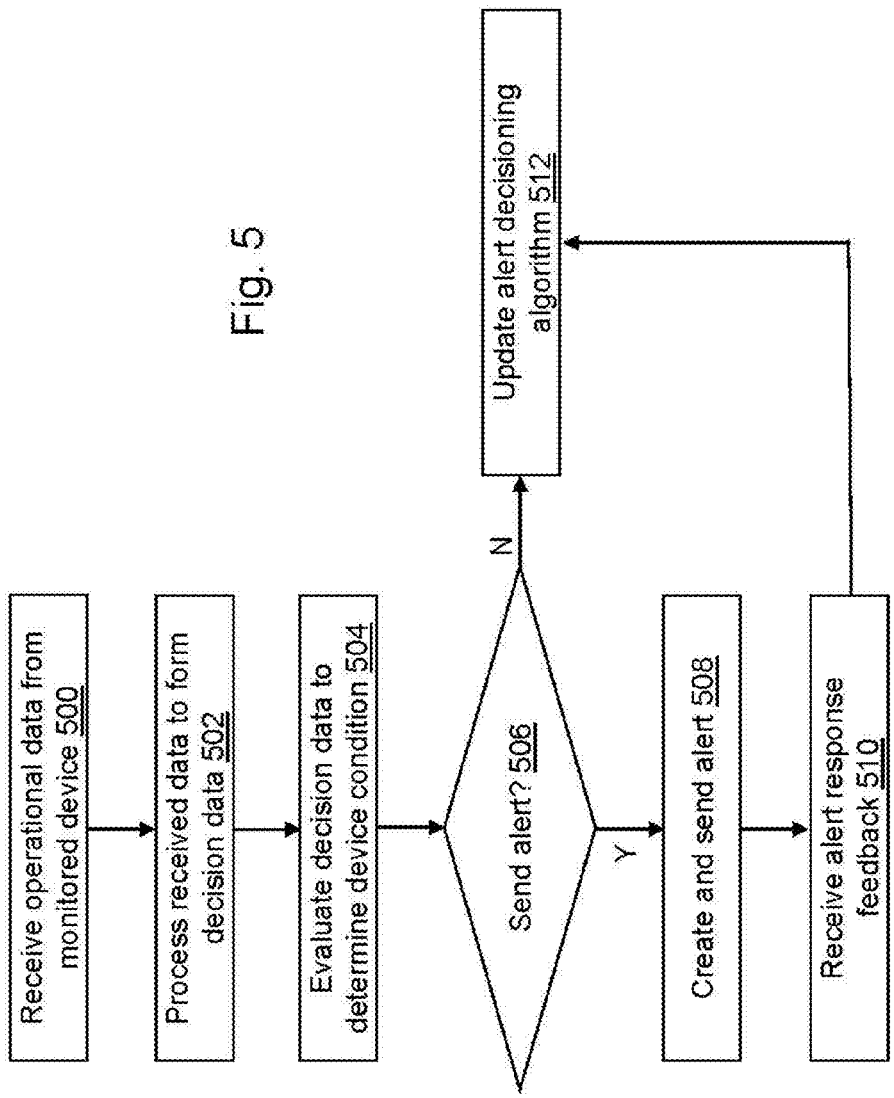
FIG. 5 depicts a flow diagram illustrating example operations performed through use of an alert decisioning application of the monitoring device of FIG. 3 in accordance with an illustrative embodiment.

With reference to FIG. 5, example operations associated with alert decisioning application 310 are described. Additional, fewer, or different operations may be performed depending on the embodiment. The order of presentation of the operations of FIG. 5 is not intended to be limiting. Thus, although some of the operational flows are presented in sequence, the various operations may be performed in various repetitions, concurrently, and/or in other orders than those that are illustrated.

In an operation 500, operational parameter data is received from monitored device 106a and saved in second computer readable medium 304 for processing. In operation 502, the received operational parameter data is processed to form decision data. The decision data may be calculated from the operational parameter data. In an illustrative embodiment, the received operational parameter data is reduced to form a multidimensional decision parameter set. In the example of monitoring MR scanner magnet coldhead failures, the initial data set is 1000 hourly samples of vessel Helium pressure. The data is first processed by non-linear denoising filters, and then by time-frequency analysis separating them into 2 components: a summary component and a detail component. The slope (k) of the summary component and the energy (E) of the detail component are calculated, and they form the decision data (or features). In other embodiments, the received operational parameter data may be used without further processing to form decision data. Thus, the received operational parameter data may be the decision data.

In an operation 504, the decision data is evaluated using a decisioning algorithm to determine a condition of various components of monitored device 106a. As understood by a person of skill in the art, the decisioning algorithm may provide detection and diagnosis of possible performance issues associated with the various components of monitored device 106a. An example of decisioning algorithm is that if (k>threshold_k1), which indicates long term pressure rise, and (E<threshold_E1), which indicates lower coldhead efficiency, then coldhead failure is predicted. For example, the decision data may include a temperature of a plurality of components of monitored device 106a. If one or more of the temperatures deviates from a "normal" operating range, a possible performance issue may be associated with a component of monitored device 106a.

The decisioning algorithm may use a training set of initial data to develop a statistical model of the operation of the various components of monitored device 106a including ranges for the operational parameter data that can be associated with a properly operating device of the type of monitored device 106a. Data may be recorded from the plurality of monitored devices 106 and used to develop a composite model of a normal device. Examples of such models include Fourier spectral coefficients, wavelet transformations described as time-frequency distributions, or principal components of high-dimensional data sets. The composite model is then used as a baseline against which the performance of monitored device 106a in the field is measured. The decisioning algorithm may compare the decision data to decision boundaries and generate one or more decisions related to the condition or status of the various components of monitored device 106a. For example, the decisioning algorithm may identify a possible performance issue associated with a component of monitored device 106a. A probability of occurrence of the possible performance issue may be calculated by the decisioning algorithm. For example, the decisioning algorithm may indicate the decision of "failed" with a 0.65 probability and the decision of "normal" with a 0.35 probability based on the decision data. The decision boundaries may be adapted by the decisioning algorithm based on data from the plurality of monitored devices 106 and data from an expert indicating whether or not the performance issue was valid as discussed further below.

In an operation 506, a determination is made concerning whether or not an alert should be sent. For example, the probability of occurrence of the "failed" decision of a component may be compared to a threshold to determine if an alert should be sent. In an illustrative embodiment, the threshold determines the number of alerts sent, but otherwise has no effect on the decision boundaries. The same or different thresholds may be used depending on the type of component that may have the possible performance issue. For example, some components may be more mission critical than others.

As a result, a threshold for generating an alert associated with that component may be lower than the threshold for generating an alert associated with less mission critical components.

If the determination is made to send an alert, processing continues at an operation 508. If the determination is made to not send an alert, processing continues at an operation 512. In operation 508, an alert message is created and sent. For example, the alert message is sent to alert response device 104a. The alert message includes a first indicator indicating the possible performance issue of the component of monitored device 106a. The alert message may include additional information such as an identifier indicating the expert to respond to the alert message, the associated operational parameter data or decision data, the time and date the alert was sent or the operation parameter data was created, an equipment identifier identifying the monitored device 106a by name and/or location, etc. The alert message may indicate a "pending failure" or "action needed" for investigation by the expert. To avoid biasing the expert, the probability of occurrence of the possible performance issue may not be included in the alert message.

A plurality of alert determinations may be made, which may be sent in the same or different alert messages. For example, high temperatures from a plurality of sensors mounted on monitored device 106a may indicate a possible clogged filter, a possible fan malfunction, or a possible circuit board malfunction. A probability of occurrence may be calculated for each possible performance issue, and a separate determination may be made to send or to not send an alert associated with each possible performance issue identified.

In an operation 510, an alert response message is received. The alert response message may be received from alert response device 104a and include an indicator indicating that the alert was either useful or not useful. Thus, the alert response message provides feedback indicating whether the alert was "useful" or a "nuisance". In an operation 512, the alert decisioning algorithm is updated. If the alert response message was received, the alert decisioning algorithm is updated based on the indicator and the operational parameter data and/or decision data. If the alert response message was not received because no alert was generated, the alert decisioning algorithm may be updated based on the operational parameter data and/or decision data.

As part of updating the alert decisioning algorithm, the thresholds may be adjusted and/or the models may be updated. Each feedback is compared with the statistical data associated with the failed/normal decision and integrated into a statistical learning machine. For example, either the failed decision or the normal decision was correct based on the feedback from the expert. Each decision part is weighted by their probability of occurrence and entered into samples for four disjoint outcome clusters: 00, 01, 10, 11, representing all possible combinations of machine-expert decisions. Additional weighting factors based on "expert credibility" and a "forgetting factor" to reduce the effects of old data may be applied as part of the update. The forgetting factor is a time based factor, which ensures that the alert decisioning algorithm adapts based on the most current environment. Feedback on marginally correct or incorrect decisions is proportionally weighted, making performance statistics that are used to drive changes in decision boundaries more accurate.

The statistical learning machine calculates the statistics of each outcome cluster and computes new decision boundaries maximizing the cumulative agreement between the expert feedback and the original failed/normal decision. The statistical learning machine can be implemented, for example, as a neural network, a support vector machine, using k-means clusters, etc. Processing continues in operation 500 as operational parameter data continues to be received and processed from the plurality of monitored devices 106.

With reference to FIG. 6, example operations associated with alert response application 410 are described. Additional, fewer, or different operations may be performed depending on the embodiment. The order of presentation of the operations of FIG. 6 is not intended to be limiting. For example, a user can interact with one or more user interface windows presented to the user in third display 412 under control of alert response application 410 independently or through use of browser application 411 in an order selectable by the user. Thus, although some of the operational flows are presented in sequence, the various operations may be performed in various repetitions, concurrently, and/or in other orders than those that are illustrated.

The user may "login" to use alert response application 410 and/or sensor processing application 210 as known to a person of skill in the art. For example, a user may execute alert response application 410, which causes presentation of a first user interface window, which may include a plurality of menus and selectors such as drop down menus, buttons, text boxes, hyperlinks, etc. associated with alert response application 410. In an illustrative embodiment, the user is a field engineer or equipment repair technician or other expert in diagnosing and/or repairing possible performance issues associated with a component of monitored device 106a.

Execution of alert response application 410 may cause presentation of a user interface window, which may include a plurality of menus and selectors such as drop down menus, buttons, text boxes, hyperlinks, etc. associated with alert response application 410. As the expert/user interacts with alert response application 410, different user interface windows are presented to provide the user with more or less detailed information related to monitored device 106a and/or the operational parameter data of monitored device 106a for which the alert was sent. As understood by a person of skill in the art, alert response application 410 receives an indicator associated with an interaction by the user with a user interface window presented under control of alert response application 410.

In an operation 600, a first indicator is received that identifies the alert to which the expert is responding. For example, a user interface window was presented under control of alert response application 410 that includes a drop down list from which the expert can select the alert or a text box into which the expert can enter an alert identifier. In an operation 602, a second user interface window is presented which includes an alert usefulness selector. For example, the alert usefulness selector may include a first button that indicates "useful" and a second button that indicates "nuisance". As another example, the alert usefulness selector may include a drop down list from which the expert selects either "useful" or "nuisance". As still another example, the alert usefulness selector may include a first radio button that indicates "useful" and a second radio button that indicates "nuisance".

In an operation 604, a second indicator is received that identifies the selection made by the user using the alert usefulness selector. For example, the second indicator may indicate that the first radio button was selected. In an operation 606, a third indicator is defined for conveying the selection to monitoring device 102. The third indicator may be the same as the second indicator. As another example, the third indicator may be "one" if the second indicator indicates that the first radio button was selected and "zero" if the second indicator indicates that the second radio button was selected.

In an operation 608, an alert response message is sent to monitoring device 102 that includes the third indicator in association with the first indicator. In an operation 610, the created alert response message is sent to monitoring device 102. For example, if alert response application 410 is implemented as a web application, the user executes browser application 411 at alert response device 104a and browser application 411 sends an HTTP message to monitoring device 102 that is processed by alert decisioning application 310. If a plurality of alerts were generated based on the operational parameter data of monitored device 106a, the expert may uniquely identify each alert and respond to whether or not each alert was or was not useful.

Using binary feedback from an expert that is directly input for processing by alert decisioning application 310 solves the problem of having to determine the "ground truth" for each alert instance and of having to correlate service records to device operational parameter data. Seeking binary feedback from the expert increases the likelihood that the expert will provide feedback and removes the ambiguity that may result from textual based feedback. The feedback is also directly tied to the alert which is directly tied to specific operational parameter data, which avoids any errors and confusion, which may result based on data generated at similar times. Accumulating feedback from many devices and many experts over many incidents greatly reduces the impact of erroneous judgments by one expert or of an abnormality of one device.

Monitoring device 102 may be the same device as alert response device 104a. Thus, some or all of the processing performed by alert decisioning application 310 may be integrated with the processing performed by alert response application 410 and/or browser application 411. Monitored device 106a may be the same device as alert response device 104a. Thus, some or all of the processing performed by sensor processing application 210 may be integrated with the processing performed by response application 410 and/or browser application 411.

A variety of different types of user interface controls may be included in the described user interface windows without limitation such as buttons, drop down menus, tabs, shortcut keys, toolbars, radio buttons, checkboxes, etc. as known to a person of skill in the art to allow a user to enter information into and/or make selections from a user interface. Those described herein are merely representative of the controls which can be used to provide the described functionality.

The word "illustrative" is used herein to mean serving as an example, instance, or illustration. Any aspect or design described herein as "example" or as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The example embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments has been presented for purposes of illustration and of description. It is not intended to be exhaustive or to limit the invention to the precise form disclosed, and modifications and variations are possible in light of the above teachings or may be acquired from practice of the invention. The functionality described may be implemented in a single application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising a monitoring device, the monitoring device comprising:
   a processor; and
   a computer-readable medium operably coupled to the processor, the computer-readable medium having computer-readable instructions stored thereon that, when executed by the processor, cause the monitoring device to:
   evaluate operational parameter data, received from a sensor mounted on a first device, using a decisioning algorithm to determine if an alert should be sent, wherein the alert indicates a possible performance issue associated with a component of the first device, and further wherein the operational parameter data comprises a value of an operating characteristic of the first device; and
   when a determination is made to send the alert,
   create an alert message, wherein the alert message includes a first indicator indicating the possible performance issue of the component of the first device;
   send the alert message to a second device; and
   update the decisioning algorithm based on a second indicator received from a third device, wherein the second indicator indicates either that the alert was useful or that the alert was not useful.

2. The system of claim 1, wherein the operating characteristic includes a parameter of a second component of the first device that is different than the first component of the first device.

3. The system of claim 1, further comprising processing the operational parameter data to form decision data before evaluating the operational parameter data, wherein the evaluating step is performed using the decision data, and the decision data is calculated from the operational parameter data.

4. The system of claim 1, wherein the second device is the same device as the third device.

5. The system of claim 4, further comprising the second device which comprises:
   a display;
   a second processor;
   a communication interface configured to receive the alert message; and
   a second computer-readable medium operably coupled to the second processor, the second computer-readable medium having second computer-readable instructions stored thereon that, when executed by the second processor, cause the second device to
   control presentation of a user interface window in the display, wherein the user interface window includes a first selector and a second selector, wherein selection of the first selector indicates that the alert was useful and selection of the second selector indicates that the alert was not useful;
   receive a third indicator indicating selection of either the first selector or the second selector;
   define the second indicator based on the received third indicator;

create the alert response message including the defined second indicator; and
send the alert response message to the monitoring device.

6. The system of claim 5, further comprising the first device which comprises:
a sensor mounted to measure the value;
a third processor; and
a third computer-readable medium operably coupled to the third processor, the third computer-readable medium having third computer-readable instructions stored thereon that, when executed by the third processor, cause the first device to
receive the value from the sensor; and
send the value to the monitoring device.

7. The system of claim 1, further comprising the first device which comprises:
a sensor mounted to measure the value;
a second processor; and
a second computer-readable medium operably coupled to the second processor, the second computer-readable medium having second computer-readable instructions stored thereon that, when executed by the second processor, cause the first device to
receive the value from the sensor; and
send the value to the monitoring device.

8. The system of claim 7, wherein the first device is the same device as the third device.

9. The system of claim 8, wherein the first device further comprises:
a display; and
the second computer-readable instructions further cause the first device to
control presentation of a user interface window in the display, wherein the user interface window includes a first selector and a second selector, wherein selection of the first selector indicates that the alert was useful and selection of the second selector indicates that the alert was not useful;
receive a third indicator indicting selection of either the first selector or the second selector;
define the second indicator based on the received third indicator;
create the alert response message including the defined second indicator; and
send the alert response message to the monitoring device.

10. The system of claim 1, wherein evaluating the operational parameter data results in determining that a second alert should be sent.

11. The system of claim 10, wherein the second alert is sent in a separate alert message.

12. The system of claim 10, wherein the second alert is included in the alert message.

13. The system of claim 10, wherein a second alert response message is received in response to the second alert.

14. The system of claim 10, wherein evaluating the operational parameter data comprises calculating a first probability of occurrence of the possible performance issue associated with the component of the first device, and comparing the calculated first probability of occurrence of the possible performance issue to a first threshold value, wherein the determination to send the alert is made based on the comparison.

15. The system of claim 14, wherein evaluating the operational parameter data comprises calculating a second probability of occurrence of a second possible performance issue associated with a second component of the first device, and comparing the second calculated probability of occurrence of the second possible performance issue to a second threshold value, wherein the determination to send the second alert is made based on the second comparison.

16. The system of claim 1, wherein evaluating the operational parameter data comprises calculating a probability of occurrence of the possible performance issue associated with the component of the first device.

17. The system of claim 16, wherein evaluating the operational parameter data comprises comparing the calculated probability of occurrence of the possible performance issue to a threshold value, wherein the determination to send the alert is made based on the comparison.

18. A computer-readable medium having stored thereon computer-readable instructions that when executed by a computing device cause the computing device to:
evaluate operational parameter data, received from a first device, using a decisioning algorithm that calculates a probability of occurrence of a possible performance issue associated with a component of the first device to determine if an alert should be sent, wherein the alert indicates a possible performance issue associated with the component of the first device, and further wherein the operational parameter data comprises a value of an operating characteristic of the first device; and
when a determination is made to send the alert,
create an alert message, wherein the alert message includes a first indicator indicating the possible performance issue of the component of the first device;
send the alert message to a second device; and
update the decisioning algorithm based on a second indicator received from a third device, wherein the second indicator indicates either that the alert was useful or that the alert was not useful.

19. A method of updating a decisioning algorithm, the method comprising:
evaluating operational parameter data, received from a first device, using a decisioning algorithm to determine if an alert should be sent, wherein the alert indicates a possible performance issue associated with a component of the first device, and further wherein the operational parameter data comprises a value of an operating characteristic of the first device; and
when a determination is made to send the alert,
creating an alert message, wherein the alert message includes a first indicator indicating the possible performance issue of the component of the first device;
sending the alert message to a second device; and
updating the decisioning algorithm based on a second indicator received from a third device, wherein the second indicator indicates either that the alert was useful or that the alert was not useful.

* * * * *